Jan. 10, 1950 H. F. OLSON 2,494,451

PERSONAL CALL SYSTEM

Filed Jan. 31, 1946

INVENTOR
Harry F. Olson
BY C.D. Tuska
ATTORNEY

Patented Jan. 10, 1950

2,494,451

UNITED STATES PATENT OFFICE 2,494,451

PERSONAL CALL SYSTEM

Harry F. Olson, Princeton, N. J., assignor to Radio Corporation of America, a corporation of Delaware Application January 31, 1946, Serial No. 644,523

3 Claims. (Cl. 177—353)

This invention relates to an improved personal call system. More specifically, it relates to a call system quite different from the conventional type of equipment found in many industrial plants in that no loud speaker system is employed.

The usual type of call system includes a central station having a microphone and amplifier. Loudspeakers are placed at suitable locations throughout the plant. In use, the operator of the central station pages the person being called and the call comes out over every loudspeaker in the plant. If a large number of persons are involved, the system will be operated almost continuously and a considerable amount of annoyance and disturbance is caused.

A principal object of this invention is to provide a call system which will enable any one person to be paged without disturbing others.

A further object is to provide a call system which includes a vest pocket device to be worn by each individual included in the system.

Another object is to provide a call system which is simple to install and economical to operate.

Another object is to provide a call system having a sufficiently large number of individual channels to be used in a large plant.

Another object is to provide a call system, including individual receivers, each one of which has reeds tuned to a different frequency or combination of frequencies.

Other objects and advantages will be apparent from the following description and from the drawings, of which Fig. 1 is a view showing how the transmitters and receivers are tied in with the central station.

Figures 1, 2, 3, 4:
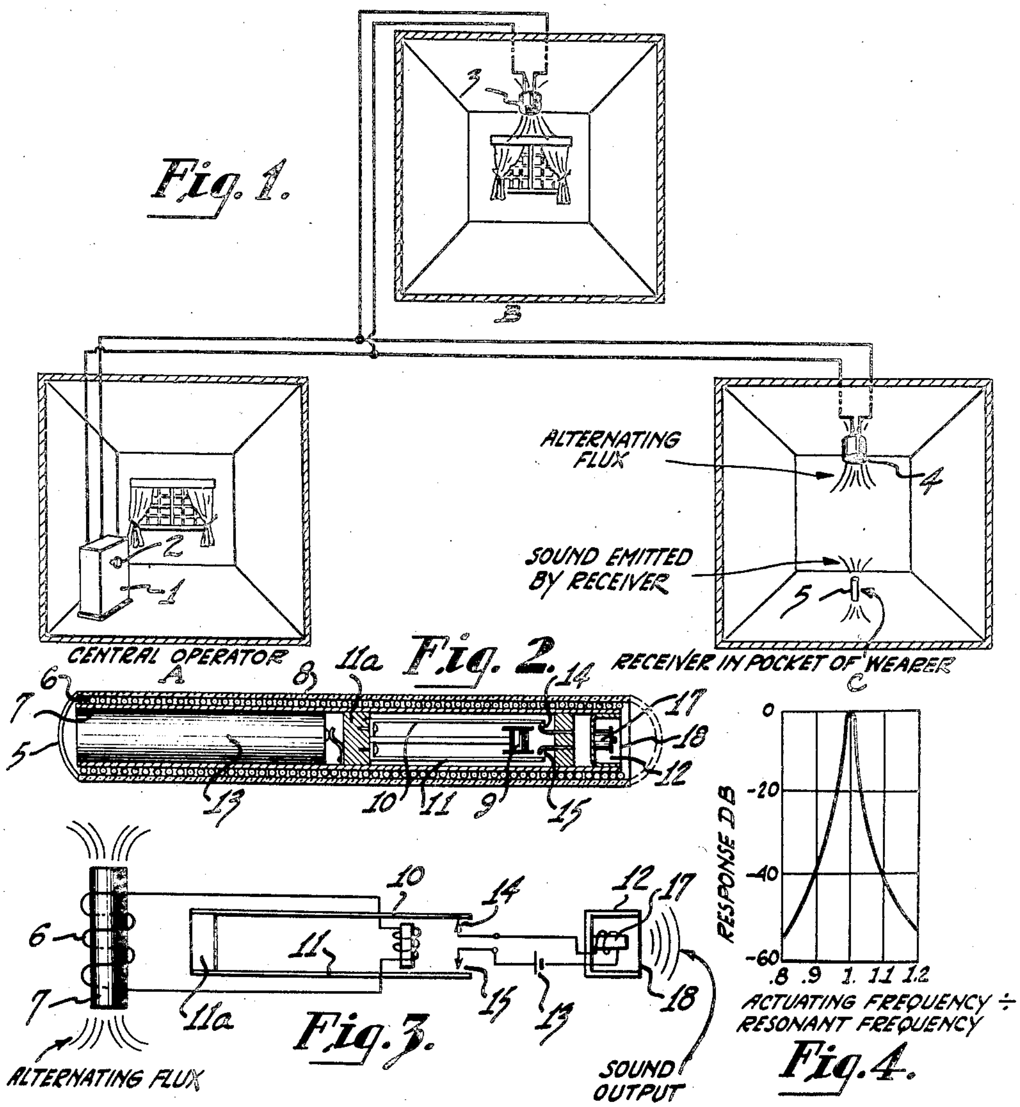
Fig. 2 is a cross-section view of one form of the receiver used in the present invention.
Fig. 3 is a circuit diagram of a receiver employed in the invention.
Fig. 4 is a curve depicting the response frequency characteristics of a tuned reed suitable for use in the system.

As shown in Fig. 1, an audio generator 1 comprising an oscillator and power amplifier is located in a central station A. The oscillator has a frequency control 2. Connected through electrical conductors to the central oscillator are transmitting coils 3, 4, etc., located at points throughout the plant such as B and C. Receiver 5, which responds to the alternating flux broadcast from the transmitting coil, is carried in a pocket of the plant employee.

Figure 5:
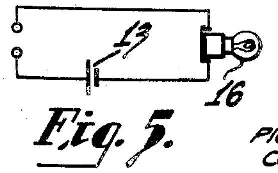
Fig. 5 is a detailed view of a modified warning signal which may be used in the receiver.

As shown in more detail in Fig. 2, each receiver, which is about the size of a pocket flashlight or fountain pen, includes a pickup coil 6 wound on a Permalloy cylinder 7. The coil picks up the energy of the alternating magnetic field produced by the transmitting coils. The Permalloy cylinder increases the amount of energy collected by the pickup coil and at the same time serves as a case for the unit. A plastic coating 8 serves as outside protection and insulation for the coil. A driving coil 9 is connected to the pickup coil. Tuned reeds 10 and 11 are actuated in response to suitable voltage fluctuations in the driving coil. A magnet 11A supplies the polarizing magnetic flux. Both reeds are tuned to the same frequency. Telephone receiver 12 powered by battery 13 emits sound when the circuit is completed through contacts 14 and 15. Alternatively, a low power lamp bulb 16 may be used in place of the telephone receiver as indicated in Fig. 5 since a light may be preferred in places where the surrounding noise level is high.

The operation of the system and circuit is simple. The operator has a table of frequencies assigned to the personnel in the plant who are subject to call. When she wishes to call a particular person, she sets the oscillator dial to the frequency assigned to that person. All transmitting coils throughout the plant generate an audio magnetic field of that frequency. This magnetic field generates a voltage in the sensitive pickup coil of each receiver, including the receiver carried by the person being called, and this voltage is fed to the driving coil of the resonant reed system. If the frequency of the actuating field corresponds to the resonant frequency to which the reeds are tuned, the amplitude of the reeds will be sufficiently large to alternately open and close the contacts at the frequency of the reeds. The reeds of all other receivers being tuned to other frequencies will not vibrate sufficiently to close the contacts in the battery circuit. However, in the one circuit in which the reeds are opening and closing, the contacts of the battery circuit will be opened and closed at the frequency of the reeds. This energizes the coil 17 of the telephone receiver which in turn causes diaphragm 18 to vibrate and emit a raucous sound of the same frequency as that of the reed. The called person knows he is being paged and can go to a telephone and call the central operator. In this procedure, no one but the person being called has been disturbed.

The power required to drive the reeds is small, about 100 microwatts being sufficient. With this small amount of power, it is necessary to use only moderate power in the central transmitting unit.

Very small batteries are used to drive the small telephone receiver and since the receiver circuit is normally open, the life of the battery is practically its shelf life.

The number of channels possible in this system varies with the number of pairs of differently tuned reeds in each receiver. Fig. 4 shows the response frequency characteristic of one of the reeds. A sufficiently wide band of frequencies must be allowed each receiver so that the call for one person does not cause the reeds in any other receiver to vibrate sufficiently to close the circuit contacts. It will be seen that the response frequency characteristic of the reed covers a very narrow band. This is desirable so that it will not respond at the resonant frequency of other reeds. For example, at .9 or 1.1 times the resonant frequency the response is down 40 db. which means that it will require 10,000 times as much power to produce a certain amplitude of the reed at these frequencies as that required at the resonant frequency. The frequency band over which the reed system is practical is 100 to 1,600 cycles. This covers about 4 octaves and the total number of channels possible with a single pair of reeds is therefore about 40.

More channels can be provided by having two or more pairs of reeds, each pair having a different frequency. In the case of two pairs, 1,600 channels are possible. With two pairs of reeds, two different oscillators are used at the central station and each receiver is tuned to a different combination of frequencies. Both frequencies are sent out over the transmitting coils simultaneously and the pickup coil impresses the combination on the driving coil. A single driving coil can be used for both pairs of reeds.

Figure 6:
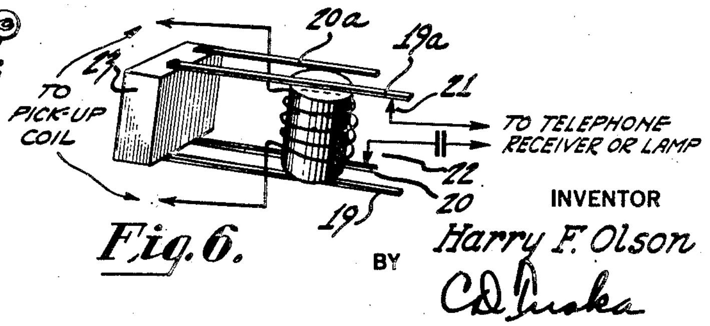
Fig. 6 is a partial circuit diagram of a modified form of receiver employing two pairs of reeds.

A receiver employing two pairs of reeds is shown in schematic diagram in Fig. 6. Reeds 19 and 19*a* are tuned to one frequency while reeds 20 and 20*a* are tuned to a frequency differing from that of the first pair of reeds by, say, several hundred cycles. The two reeds in each pair are electrically connected through the magnet 23 and both pairs are also connected through the magnet 23. When and only when the two frequencies to which each pair of reeds is respectively tuned are sent out from the oscillators over the transmitting coils, both pairs of reeds respond at the same time and, making intermittent contact through poles 21 and 22, actuate the receiver or lamp through the battery. If the frequency of only one of the pairs of reeds is sent out, the circuit will not be closed since one of the two contacts 21 or 22 will remain open.

As previously mentioned, the receiver is extremely compact, the dimensions of Fig. 2 being about actual size. This enables it to be conveniently worn clipped to a coat or vest pocket.

I claim as my invention:

1. A personal call system of the class described comprising a central audio generator, a plurality of transmitting coils located at different locations and connected to said generator for creating an audio magnetic field when actuated by said generator, a plurality of small, individual receivers, each adapted to be carried by a person subject to call on said system, each of said receivers having means for picking up energy from the magnetic field of a coil adjacent thereto, driving means actuated by said pickup means, reeds responsive to said driving means, each reed being tuned to respond to only one frequency within the output range of said audio generator, and means actuated by response of said reeds for arresting the attention of a person carrying one of said receivers, said last mentioned means including a battery and a signal device.

2. In a personal call system, a "vest-pocket" receiver comprising a casing, a pickup coil wrapped on said casing and extending the length thereof, a driving coil within said casing and connected to said pickup coil, at least one pair of tuned polarized reeds actuatable by voltage fluctuations within said driving coil, a signal device, actuatable by vibration of said reeds and a battery for operating said signal device, said battery, said reeds, and said signal device all being positioned substantially in line and within said casing, whereby to form a compact, pencil-like unit.

3. A receiver according to claim 2 in which said casing is made of a material of relatively high magnetic permeability.

HARRY F. OLSON.

REFERENCES CITED

The following references are of record in the file of this patent:

UNITED STATES PATENTS

| Number | Name | Date |
|---|---|---|
| 388,091 | Rysselberghe | Aug. 21, 1888 |
| 887,357 | Stubblefield | May 12, 1908 |
| 1,689,121 | Ferdon | Oct. 23, 1928 |
| 1,797,696 | Ruddy | Mar. 24, 1931 |
| 1,955,558 | Nelson | Apr. 17, 1934 |
| 2,122,145 | Kear | June 28, 1938 |
| 2,138,894 | Ware | Dec. 6, 1938 |
| 2,293,166 | Olson | Aug. 18, 1942 |

FOREIGN PATENTS

| Number | Country | Date |
|---|---|---|
| 323,184 | Great Britain | Dec. 20, 1929 |
| 495,171 | Great Britain | Nov. 8, 1938 |